Feb. 23, 1960 C. E. RICKARD 2,925,992
PRESSURE SEALED HYDRANT VALVE
Filed Aug. 6, 1958
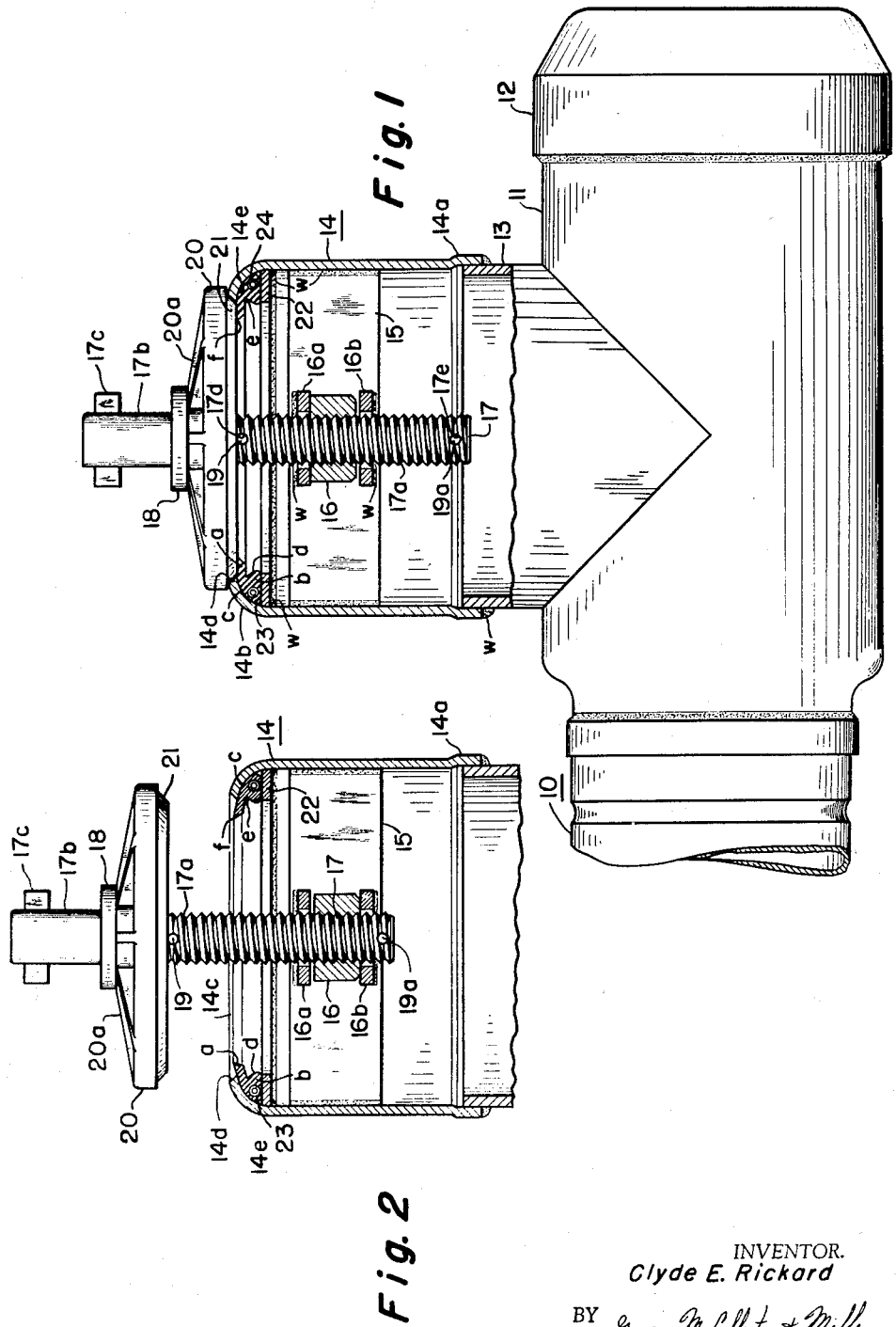
INVENTOR.
Clyde E. Rickard
BY Green, McCallister + Miller
HIS ATTORNEYS United States Patent Office 2,925,992
Patented Feb. 23, 1960

2,925,992

PRESSURE SEALED HYDRANT VALVE

Clyde E. Rickard, Pittsburgh, Pa., assignor to McDowell Manufacturing Company, Millvale, Pa., a corporation of Pennsylvania Application August 6, 1958, Serial No. 753,510

5 Claims. (Cl. 251—172)

This invention relates to a hydrant valve and a pressure sealed valve construction for providing a fluid-pressure seal, and more particularly, to a fluid-pressure-sealing gasket arrangement within the valve for obtaining a fluid-pressure-responsive seal for a line contact closure between a valve head and a valve seat when the valve is closed-off.

Commonly known types of hydrant valves incorporate a sealing gasket between the valve head and the valve seat. When the valve is to be closed-off, the valve head has to be tightened against the valve seat in order to accomplish a fluid seal with the gasket. This tightening-down operation requires the operator to apply an appreciable amount of force to the closing mechanism, in order to accomplish the desired sealing effect.

In addition to the above noted disadvantages encountered with known hydrant valve sealing gaskets, the continued force exerted on the sealing gasket by the valve head soon ruptures the gasket and causes serious leaking, detrimental to the operation of the valve. As a result, the operable life of these gaskets is extremely short, and therefore the hydrant valve requires an excessive amount of "down time" and maintenance in order to replace the gaskets and keep the valve in functional operation.

An object of my invention has been to find a solution to the problem thus presented.

Another object has been to provide an improved sealing for hydrant valves.

A further object of my invention is to provide a hydrant valve with a fluid-pressure gasket which operates independently of the force necessary to close the valve.

An additional object of my invention is to provide a fluid-pressure-sensitive sealing gasket for use in a hydrant valve body.

These and other objects of my invention will be apparent to those skilled in the art from the following disclosure and drawings in which:

Figure 1 is a side elevational view in section of a hydrant body incorporating my sealing construction and showing its valve head in a closed position;

Figure 2 is a side elevational view in section similar to Figure 1, but showing the valve head in an open position.

Referring now to the drawings, a conduit 10 is shown connected to one end of a T joint 11 to supply fluid thereto. The opposite end of the T joint 11 is shown provided with a coupling nose 12 within which a conduit member or a dead end member may be positioned, as desired. A valve body or gasket housing 14 is shown secured to the vertical leg 13 of the T joint 11 as by a weld $w$. The lower end of the valve body 14 has an annular, radially-outwardly offset rim end portion 14a which is adapted to telescope over the outer end of the vertical leg 13 to provide ease of assembly. The valve body 14 is generally of cylindrical configuration and has a radially-inwardly curved top or nose end portion 14b. A fluid passageway or orifice 14c is provided through the nose portion 14b (see Figure 2). An inwardly-converging, sloped, annular valve seat or guiding surface 14d of frusto-conical configuration, circumscribes the outer periphery of the orifice 14c at the edge termination of the nose portion 14b. Inner, rounded surface 14e of the nose portion 14b constitutes a gasket-retaining and sealing surface. An annular gasket retaining flange or flat ring 22 extends radially-inwardly of the valve body 14 and is secured to the inner surface of the nose part adjacent the lower or inner portion of the gasket-retaining surface 14e, as by means of weld metal $w$.

An internally-threaded nut 16 is held against rotation in axial alignment with the longitudinal axis of the valve body 14 by a plurality of spaced-apart, passageway-defining, radial web members 15 that extend transversely across the inside of the valve body. The center portions of the web members 15 are recessed, so that the nut 16 may slide vertically therein but will not rotate. A top washer 16a is welded to the web members 15. The nut 16 is slid up into the web members 15, and a bottom member or washer 16b is welded in place beneath the nut. The washers 16a and 16b are preferably made of a suitable metal such as steel. With this arrangement, the lower washer 16b may be removed and the nut 16 slid out and replaced with another nut having a different thread, if so desired.

A valve stem 17 having an externally-threaded adjustment portion 17a cooperates with and extends into the internally threaded nut 16. The valve stem 17 has a smooth upper portion 17b and an integral annular flange 18 secured thereto. A cover member or top plate 20 has an under-positioned valve head seating guiding surface 21 of frusto-conical shape which is opposed to and complements the valve seat 14d when the valve is in a closed position. The member 20 is positioned on the valve stem 17 in abutment with the integral flange 18 and is held in vertical alignment thereon by a pin 19 passing through a cross recess 17d that is located adjacent the underside of the top member 20. As shown, the top member 20 may be provided with a plurality of reinforcing ribs 20a.

Latch pin 17c for a bayonet connection is secured to extend through a cross bore in the smooth, upper end portion 17b of the valve stem 17. A slot or cross bore 17e, adjacent the bottom of the valve stem 17, securely receives a pin 19a to prevent the stem from being completely unscrewed or extracted from the nut 16 during its operation.

A gasket 23 is positioned within the valve body to bear or rest at its bottom heel or base on the gasket-retaining ring 22 and compressibly seat against gasket-retaining surface 14e. The gasket 23 has a radially-inwardly extending annular wing portion $a$, a base or heel portion $b$ which bears on the gasket-retaining ring 22 in compression, a curved outer side portion $c$ which is held in compression against the gasket-retaining surface 14e, and an inwardly-directed, fluid chamber defining side portion $d$. The portion $d$ connects the base portion $b$ and the wing portion $a$ in such a manner as to form a recess or chamber $e$. The end of the wing portion terminates in an inwardly-diverging, sloped sealing lip edge $f$. An annular spring coil 24 is embedded within the base portion $b$ of the gasket 23 and is employed to reinforce the gasket and to hold it in place in compression within the valve body. The gasket 23 may be of one-piece construction of a suitable resilient material, such as natural or synthetic rubber, with the spring 24 cast or molded integrally therein.

When the valve is in an open position, as shown in Figure 2, the wing portion $a$ of the gasket 23 expands upwardly and outwardly of the valve body 14, due to the resilient nature of the gasket material. When the valve stem 17 is screwed downwardly within or along the nut 16 to close-off the valve, the valve head 20 moves downwardly toward the nose portion 14b. The complementary frusto-conical shape of the seating lip or guide face of the seating part 21 with respect to the seating or guide surface 14d of the valve assures an accurate alignment of the valve head as it proceeds in its downward or closing movement. In addition, the complementary frusto-conical surfaces provide a surface area contact therebetween when the valve head is screwed down on the valve seat. This area contact terminates in an annular line contact on the inside of the hydrant valve body, adjacent the wing portion a of the gasket 23. It is this line contact which is sealed-off by fluid pressure within the valve body, acting on the fluid pressure sealing gasket 23.

When the valve is being closed, the planar or flat bottom of the valve head part 21 contacts the wing portion a of the gasket and pushes it downwardly from the expanded position shown in Figure 2, to the substantially depressed, horizontally-planar position shown in Figure 1. When the valve is closed, the fluid pressure within the valve body 14 acts within the chamber e, against the outer surface of the wing portion a, to push the sealing wing portion a upwardly and outwardly against the sealing surface on the bottom of the valve head part 21 and the sealing surface 14e to form a fluid-pressure-proportioned, fluid-tight pressure seal at the exposed line contact of the valve seat. With this arrangement, it is not necessary that the valve head be forceably tightened downwardly against the gasket, in order to provide a fluid-tight seal. The valve head, on the other hand, is merely turned to a closed position, and the fluid pressure within the valve body provides the necessary seal by acting on the fluid pressure sealing gasket 23. When the valve is opened, fluid is again allowed to pass through the orifice 14c and the ring portion a of the gasket is expanded outwardly, as shown in Figure 2. It will be noted that the upward movement of the valve stem 17 is limited by pin 19a which abuts against the washer 16b when the valve head 20 is in its fully open position.

It is to be further noted that the opposed guiding or seating surfaces 14d and 21, formed in the nose portion 14b and the valve head 20 respectively, cooperate with one another to partially close off the orifice 14c, when the valve head 20 is moved to its closed position. It is to be understood, however, that these complementary opposed surfaces by themselves do not necessarily provide a fluid-tight joint therebetween, but may provide a narrow flow passageway therethrough. The fluid-pressure-sensitive gasket 23, which is mounted to seat against the sealing surfaces of the valve head 20 and nose portion 14b, provides a positive fluid seal across the joint or passageway along the sealing surfaces which are adjacent to and in an offset relationship to the complementary opposed guiding or sealing surfaces 14d and 21.

Whereas this invention is illustrated and described with respect to my now preferred embodiment, it is to be understood that various changes and modifications may be made therein and that other embodiments may be adopted on the basis of the teachings hereof, by those skilled in the art, without departing from the scope of the invention, as defined by the following claims.

What I claim is:

1. In a hydrant valve having a hollow cylindrical valve body and a radially-inwardly flanged nose portion, with an orifice formed through said nose portion: an annular downwardly-inclined valve seat surrounding said orifice, a valve stem carried for vertical movement by said valve body, a valve head secured to said valve stem, an inclined valve head seating surface complementing said valve seat to provide a surface area contact therewith when the valve head is in an initially closed position, said surface area contact terminating in an annular line contact adjacent the inner surface of said nose portion, and a fluid-pressure-responsive resilient gasket positioned within said nose portion adjacent said valve seat, said gasket being flexibly compressed upon the closure of said valve head to initially seal off fluid flow through said line contact, and said gasket providing a further sealing action responsive to fluid pressure within said valve head.

2. In a pressure-sealed hydrant valve having a cylindrical valve body terminating in an open-mouth nose portion and having a frusto-conical valve seat about its periphery to complement a frusto-conical seating surface on a valve head mounted on a valve stem for vertical movement into and out of engagement with said valve seat, an annular fluid-pressure-sensitive sealing gasket positioned within said nose portion adjacent said valve seat, said gasket comprising: an annular radially-inwardly-extending wing portion compressibly positionable against an annular line contact formed between said engaged valve seat and said valve seating surface adjacent the inner surface of the nose portion to seal-off fluid flow through the open-mouth portion, said wing portion being normally flexed axially-outwardly of the valve body when the valve is opened and compressibly-flexed inwardly by the valve head upon closing the valve to initially seal-off fluid flow through the annular line contact, a base portion supported within the nose portion, a curved outer side portion compressibly contained within the nose portion against an inner surface thereof, a coil spring embedded within said base portion to reinforce the gasket and retain it in place, and a fluid-pressure-responsive chamber formed adjacent said wing portion to positively urge said wing portion across the line contact and provide a supplemental sealing pressure responsive to the fluid pressure within the hydrant valve body.

3. In a hydrant valve having a cylindrical valve body terminating into a nose portion and having a valve stem carried for vertical movement by the valve body, an improved fluid seal comprising, a frusto-conical valve seat formed in the end of said nose portion, an orifice extending through said nose portion, a valve head retained by said valve stem, a frusto-conical valve head seating surface on said valve head to complement said valve seat and form a surface area contact therebetween upon an initial abutment of the seating surfaces when the valve is closed, said surface area contact terminating in an annular line contact adjacent the inner surface of said nose portion, a fluid-pressure-sensitive sealing gasket compressibly retained within said nose portion, said gasket having a radially-inwardly-extending wing portion adjacent said valve seat, said wing portion being normally flexed axially-outwardly of the valve body when the valve is opened, said wing portion being compressibly flexed inwardly by said valve head as it is closed to provide an initial seal for the line contact, and said gasket being responsive to fluid pressure within said valve body.

4. A pressure-sealed hydrant valve comprising, a hollow cylindrical valve body secured at one end to a fluid conduit, a radially-inwardly-curved nose part formed at the opposite end, web means extending transversely across the inside of said valve body to support an internally-threaded nut against rotation, an externally-threaded valve stem engaged within said nut for relative vertical movement therewith, a valve head secured to said valve stem and having a sealing surface, a frusto-conical seating surface formed on the underside of said valve head, a complementary frusto-conical valve seat formed in the end of said nose part, said seating surface and said valve seat forming a surface area contact upon an initial closure of the valve, a retainer ring secured to the inner wall of said valve body adjacent said nose part, a resilient annular pressure-sealing gasket retained adjacent said valve seat by said nose part and said retainer ring, said gasket having a radially-inwardly-extending wing portion which is normally flexed axially-outwardly of said valve body when the valve is opened, and which is flexed inwardly upon a closure of the valve to initially seal-off the contact between the sealing surface of said valve head and said valve seat, and said gasket being responsive to fluid pressure within said valve body to complement the compressive sealing action of said gasket.

5. In a hydrant valve construction having surface area contact between a frusto-conical valve seat formed in a valve body and a frusto-conical valve head when the valve head is in an initial closed position, an annular pressure-sensitive sealing gasket to seal off fluid flow through a line contact formed between the engaged valve head and valve seat adjacent an inner surface of the valve body, said sealing gasket comprising, a radially-inwardly directed annular wing portion which is axially-outwardly flexibly compressible against the inner surface of the valve body and an inner surface of the valve head to provide an initial sealing action along the line contact, a coil spring imbedded within a base portion of said gasket to compressibly retain the gasket against an inner surface of the valve body, and an expansion chamber formed in an inner periphery of said gasket adjacent said wing portion to expand said wing portion into a high pressure fluid-tight seal about said line contact responsive to fluid pressure within the valve body.

References Cited in the file of this patent

UNITED STATES PATENTS

| | | |
|---|---|---|
| 1,556,551 | Waterman | Oct. 6, 1925 |
| 1,947,071 | Walton | Feb. 13, 1934 |
| 1,947,309 | Rowley | Feb. 13, 1934 |
| 2,258,135 | Curtis | Oct. 7, 1941 |
| 2,366,520 | Griffith | Jan. 2, 1945 |
| 2,586,735 | Stoltz | Feb. 19, 1952 |